United States Patent
Nonko et al.

(10) Patent No.: US 7,283,996 B2
(45) Date of Patent: Oct. 16, 2007

(54) CONVERTING EXPRESSIONS TO EXECUTION PLANS

(75) Inventors: Eugene N. Nonko, Redmond, WA (US); Mark H. Lucovsky, Sammamish, WA (US); Arthur Zwiegincew, Bothell, WA (US); Shaun D. Pierce, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 11/050,177

(22) Filed: Feb. 2, 2005

(65) Prior Publication Data

US 2005/0131891 A1 Jun. 16, 2005

Related U.S. Application Data

(63) Continuation of application No. 10/158,970, filed on May 30, 2002, now Pat. No. 6,862,590.

(51) Int. Cl.
G06F 17/30 (2006.01)
(52) U.S. Cl. .............................................. 707/4; 707/5
(58) Field of Classification Search .............. 707/1–10, 707/100–104.1; 715/513, 501; 709/217–229
See application file for complete search history.

(56) References Cited

U.S. PATENT DOCUMENTS

| 5,778,358 | A | 7/1998 | Blackman et al. | ............. | 707/3 |
| 6,240,407 | B1 | 5/2001 | Chang et al. | ................... | 707/2 |
| 6,366,934 | B1 | 4/2002 | Cheng et al. | ............... | 707/513 |
| 6,882,995 | B2 * | 4/2005 | Nasr et al. | ....................... | 707/3 |
| 7,013,311 | B2 * | 3/2006 | Hui et al. | ................. | 707/104.1 |

OTHER PUBLICATIONS

Cutlip, R; Web Services: The New Web Pardigm, Part 2; *DB2 Magazine*; vol. 7; No. 1; 2002; pp. 40-46.

Shanmugasundaram, J. et al.; A General Technique for Querying XML Documents Using a Relational Database System; *SIGMOD Record*; vol. 30; No. 3; Sep. 2001; pp. 20-26.

Shanmugasundaram, J. et al.; Relational Databases for Quering SML Documents: Limitations and Opportunities; *Proceedings of the 25th International Conference on Very Large Data Bases*; 1999; pp. 302-314.

Amagasa, T. et al.; Realizing Temporal XML Repositories Using Temporal Relational Databases; *Proceedings of the 3rd International Symposium on Cooperative Database Systems for Advanced Applications*; 2000; pp. 60-64.

(Continued)

*Primary Examiner*—Yicun Wu
(74) *Attorney, Agent, or Firm*—Workman Nydegger

(57) ABSTRACT

Methods, systems, and computer program products for converting a single expression referencing multiple branches within a hierarchical schema into multiple expressions referencing a single branch of the hierarchical schema. The single expression includes expression components that identify branches within the hierarchical schema. Relative to a given branch, any branches referenced by a given expression component are identified. The identified branches are stored as new branches. If no branch is identified, the current branch may be removed as inconsistent. Storage for current branches is cleared, the new branches are copied to the current branches, and the process is repeated for each expression component. An expression component may include a predicate for determining which branches are referenced. The predicate may include predicate expressions that are converted to predicate branches and the predicate may include predicate operators. Predicate operators are combined with predicate branches to identify all branches referenced by the predicate.

20 Claims, 4 Drawing Sheets

OTHER PUBLICATIONS

Cheng, J. et al.; XML and DB2; *Proceedings of the 16th International Conference on Data Engineering*; 2000; pp. 569-573.

Clark, James et al; XML Path Language (XPATH) Version 1.0; *W3C REcommendation*; Nov. 16, 1999; http://www.w3.org/TR/1999/REC-xpath-19991116; accessed May 21, 2002.

Fallside, David; XML Schema Part 0: Primer; *W3C Recommendation*; May 2, 2001; http://www/w3.org/TR/xmlschema-0/; accessed May 21, 2002.

Thompson, Henry S. et al.; XML Schema Part 1: Structures; *W3C Recommendation 2*; May 2, 2001; http:www.w3.org/TR/xmlschema-1/; accessed May 21, 2002.

Biron, Paul V. et al.; XML Schema Part 2: Datatypes; *W3C Recommendation*; May 2, 2001; http://www.w3.org/TR/xmlschema-2; accessed May 21, 2002.

\* cited by examiner

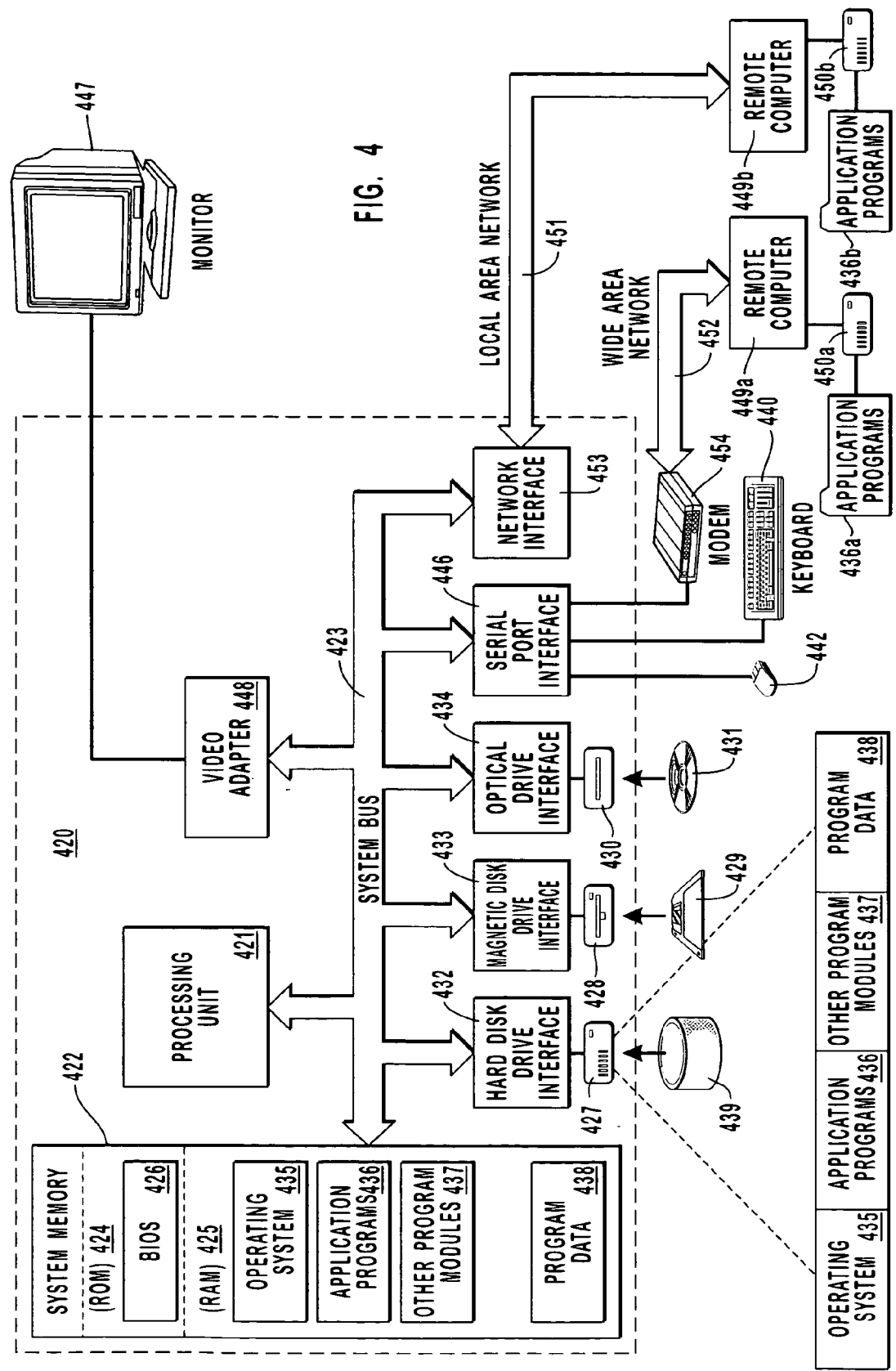

CONVERTING EXPRESSIONS TO EXECUTION PLANS

CROSS-REFERENCE TO RELATED APPLICATIONS

This application is a continuation of application Ser. No. 10/158,970, filed May 30, 2002, now U.S. Pat. No. 6,862, 590 and entitled "CONVERTING EXPRESSIONS TO EXECUTION PLANS" the disclosure of which is incorporated herein by reference, in its entirety.

BACKGROUND OF THE INVENTION

1. Field of the Invention

The present invention relates to the field of data access. More specifically, the present invention relates to methods, systems, and computer program products for converting a single expression that references multiple branches within a hierarchical schema into multiple expressions that each reference a single branch of the hierarchical schema.

2. Background and Related Art

Using hierarchical schemas to define data relationships is becoming increasingly popular. These hierarchical schemas often use tags or markups to define data elements and attributes. One currently popular technology for defining hierarchical schemas and marking up data is eXtensible Markup Language ("XML"). Among other reasons, XML is popular because it provides significant flexibility in exchanging data between computer systems.

Storage mechanisms for data defined by hierarchical schemas may take a variety of forms and are not necessarily specific or native to the underlying hierarchical schema. Although native storage mechanisms typically offer performance, design, and other benefits, there are often significant resource requirements for supporting multiple native storage mechanisms. For example, relational database management systems ("RDBMSs") supporting Structured Query Language ("SQL") are commonplace in many organizations. As a result, RDBMSs are likely to make use of existing hardware, software, support and administration personnel, design expertise, etc., whereas introducing some other storage mechanism is more likely to require additional hardware, software, training, and personnel. Accordingly, using an RDBMS is attractive even if a relational data model lacks native support for some external aspects of a particular hierarchical model.

One problem that may be encountered in using an SQL database to store XML data relates to differences in how XML and SQL data may be referenced. For example, depending on the implementation, it may be possible for an SQL statement to select the data corresponding to only a single schema branch, whereas in general, XML may reference multiple schema branches at varying levels within the hierarchy. In other words, XML allows for ambiguity in referencing schema branches (e.g., expressions that include "*" or "|" or "//") that may not be supported in an SQL database. For purposes of illustration, consider a shipping record that includes a number of schema date elements, such as a current date, an order date, a shipping date, a backorder date, etc. Using XML, it may be possible to reference all date elements with a single expression. However, referencing the same date elements in SQL may require multiple expressions. In converting from an XML expression to an SQL expression, it may be desirable or necessary to remove the ambiguity (i.e., the referencing of multiple schema elements) from the XML expression.

More generally, similar problems may be encountered when converting queries or expressions from any language to another, because an expression in one language may require multiple expressions in the other. XML and SQL merely provide examples of queries or expressions that may lead to this problem. Accordingly, methods, systems, and computer program products for converting a single expression that references multiple branches within a hierarchical schema into multiple expressions that each reference a single branch of the hierarchical schema are desired.

BRIEF SUMMARY OF THE INVENTION

The present invention extends to methods, systems, and computer program products for converting a single expression that references multiple branches within a hierarchical schema into multiple expressions that each reference a single branch of the hierarchical schema. The single expression may include one or more expression components. Each of these expression components identifies zero or more branches within the hierarchical schema. Relative to each of one or more current branches, each of the zero or more branches that are referenced by a current expression component are identified. These zero or more branches are then stored as new branches. If no branch is identified, the current branch may be removed as inconsistent. Storage for current branches is cleared, the new branches are copied to the current branches, and the process is repeated for each expression component.

An expression component may include a predicate for determining which of zero or more branches are referenced. The predicate may include zero or more predicate expressions that are converted to zero or more predicate branches as described above and the predicate may include zero or more predicate operators. Predicate operators are combined with predicate branches to identify all branches referenced by the predicate.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

The present invention extends to methods, systems, and computer program products for converting a single expression that references multiple branches within a hierarchical schema into multiple expressions that each reference a single branch of the hierarchical schema. As indicated above, hierarchical and other schemas may be used to define logical relationships for data independent of the data's underlying physical storage or management mechanisms. Some hierarchical schemas, such as eXtensible Markup Language ("XML") schemas, may use tags or markups to define data elements and attributes, whereas others schemas, such as those defining relational databases that are accessed through structured query language ("SQL") typically do not use tags or markups. It should be emphasized, however, that describing embodiments of the present invention in terms of XML and SQL is exemplary only and should not be interpreted as limiting the invention's scope. Accordingly, as used in this application, the term "schema" should be interpreted broadly to encompass virtually any technique for describing how data is structured, organized, and/or related, including techniques for describing the structure, organization, and/or relationships of relational data, object oriented data, XML data, etc.

Figure 1:
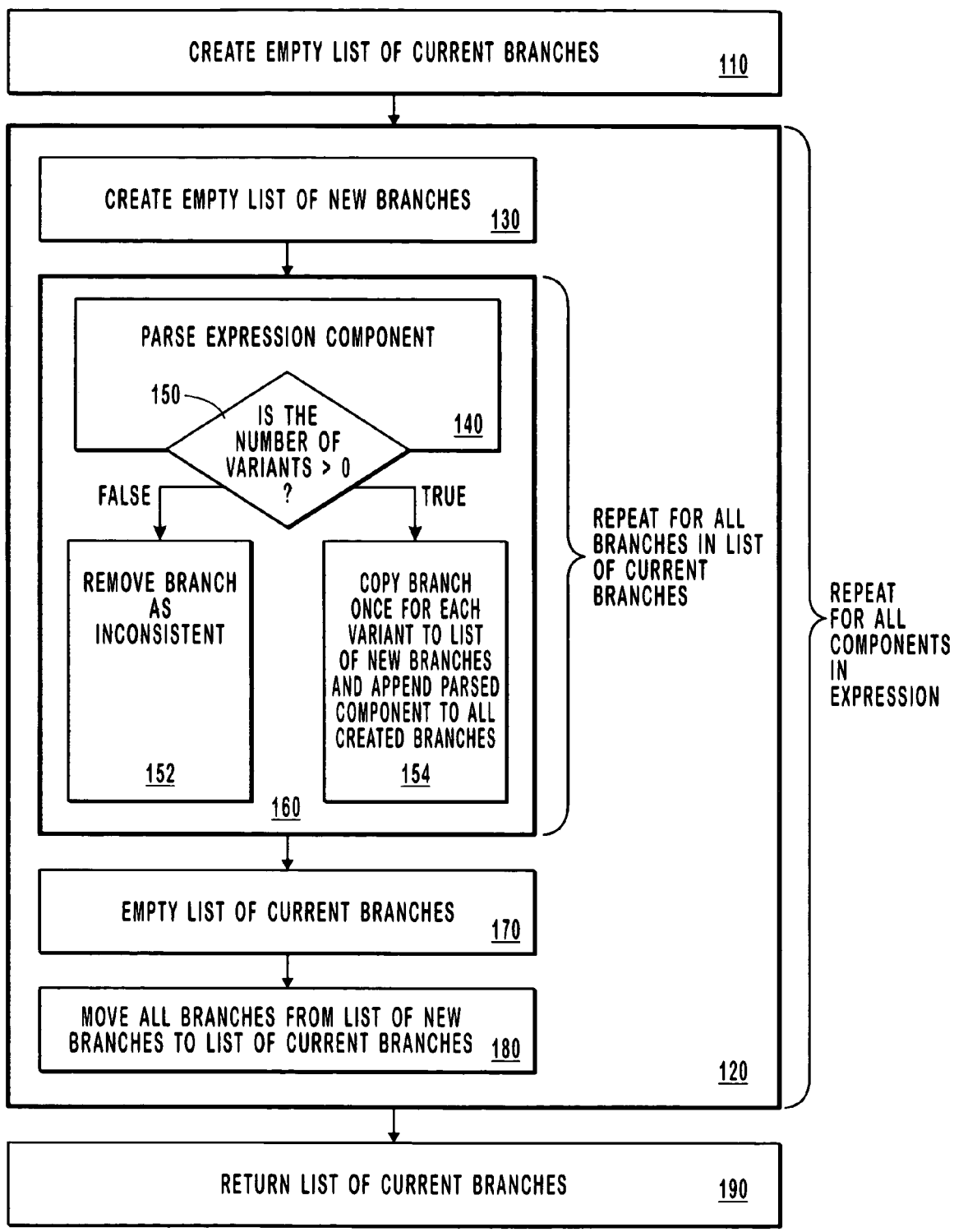
FIG. 1 is a flowchart of an example embodiment for converting a single expression in accordance with the present invention.

FIG. 1 is a flowchart of an example embodiment for converting a single expression referencing multiple hierarchy branches into multiple statements referencing single hierarchy branches. For example, XPath expressions that include "*" or "|" or "//" often refer to multiple hierarchy branches. These constructs also may appear in XPath predicates, the conversion of which is described below with reference to FIG. 2. After describing the flowchart of FIG. 1, several example XPath expressions are converted for an example XML schema.

In block 110, an empty list of current branches is created, such as by clearing existing storage or allocating new storage for current branches. Note that the term "list" should be interpreted broadly to encompass any collection of zero of more data items and is not necessarily limited to any particular data structure or data object. Then, the processing in block 120 is repeated for each component in the expression to be converted. For example, the XPath expression /root/*/c includes three components separated by forward slashes.

Beginning at block 130, an empty list of new branches (relative to a current expression branch) is created, such as by clearing existing storage or allocating new storage. Then, the processing in block 160 is repeated for each branch in the list of current branches. Initially, the current expression branch and list of current branches are empty because no expression branches have been identified. In block 140, the next expression component is parsed and the branches it references are identified. Using the example XPath expression from above, /root would be parsed and identified the first time block 140 executes. Decision block 150 tests if the number of variants referenced by the parsed expression component is greater than zero. In other words, decision block 150 tests how many branches matching /root were identified in the schema. Ordinarily, a hierarchical schema includes one root entry, with additional entries as various other levels within the hierarchy. As indicated previously, more detailed examples follow below.

If a parsed expression component fails to reference any branches, the current expression branch (each of the branches in the list of current branches taken one at a time) is removed from consideration as inconsistent. Essentially this means that the current expression branch does not meet the criteria imposed by the newly parsed expression component. If the number of variants is greater than zero, in block 154 the current expression branch is copied, once for each variant, to the list of new branches, and the branches identified in parsing the expression component are appended to each of the newly created branches.

The list of current branches may be thought of as a list of candidate branches that may or may not meet the criteria imposed by the parsed expression component. Once the processing of block 160 is repeated for each branch in the list of current branches, the candidates meeting the criteria imposed by the parsed expression component have all been added to the list of new branches and have been further limited by the appended branches identified by the parsed expression component. In block 170, the list of current braches is emptied or cleared, and in block 180, the branches in the list of new branches are moved to the list of current branches. The term "move" should be interpreted broadly to encompass any technique for indicating that the newly created branches are now current branches, and is not limited to any particular operation or sequence of operations.

As indicated above, the processing of block 120 is repeated for each component in the expression to be converted. For each component after the first, the current branches moved in block 180 are the current branches processed in block 160. Once each component of the expression to be converted is processed in block 120, the list of current branches contains a branch for each of the multiple branches within the hierarchical schema that are referenced by the single branch expression. In block 190, the list of current branches is returned to the requestor.

Each of the examples below are based on the schema illustrated by the following document skeleton:

TABLE I (Example Schema)

```
<root>
    <a>
        <c> ... </c>₀ ... unbounded
        <x> ... </x>₀ ... unbounded
    </a>₀ ... unbounded
    <d>
        <b> ... </b>₁ ... unbounded
        <c> ... </c>₁ ... unbounded
    </d>₀ ... unbounded
    <f>
        <b> ... </b>₀ ... unbounded
    </f>₀ ... ₁
</root>₁ ... ₁
```

In Table I, subscripts indicate the number of times an element can appear in a document that conforms to the schema. For example, under /root/a, element c can appear any number of times—the minimum is zero and the maximum is unbounded.

Table II illustrates an example XML document that conforms to the schema illustrated in Table I. Note that not every element existing in the schema will necessarily appear in a corresponding XML document. For example, the schema allows for any number of x elements to appear under /root/a/c, but in the XML document shown in Table II, no x elements are present. Also note that two c elements appear under /root/a in this particular XML document.

TABLE II (Example XML Document)

```
<root>
    <a>
        <c> ... </c>
        <c> ... </c>
    </a>
    <d>
        <b> ... </b>
        <c> ... </c>
    </d>
    <f>
        <b> ... </b>
    </f>
</root>
```

For the first example, the XPath expression /root/a/c is to be converted. At block 110, an empty list of current branches is created. Following block 110, the processing of block 120 is repeated for all components in the expression. Beginning in block 130 an empty list of new branches is created. Then, the processing of block 160 is repeated for all branches in the list of current branches. The first time through processing block 120 and processing block 160, the list of current branches and the current expression branch are empty. The next expression component /root is parsed and the branches it references (the variations of the expression component in the schema) are identified in block 140. Because /root appears once in the schema, the number of variants is one. In block 154, the current expression branch, which is empty the first time through block 120 and block 160, is copied to the list of new branches once and /root is appended.

At this stage, all branches in the list of current branches have been considered so the processing of block 160 terminates. The list of current branches is emptied in block 170 and all of the branches from the list of new branches (/root) are copied to the list of current branches in block 180. Now, the processing of block 120 is repeated for the next component in the expression to be converted. An empty list of new branches is created at block 130. Then, in block 140 the next expression component /a is parsed and the branches it references relative to the current expression branch /root are identified. Relative to /root the parsed expression component /a appears in the schema once, and therefore the true branch of decision block 150 is taken. In block 154, the current expression branch /root is copied to the list of new branches once, and the parsed and identified expression branch /a is appended to each of the newly created branches (one in this case).

Because /root is the only branch in the list of current branches, the processing of block 160 terminates. In block 170, the list of current branches is emptied and in block 180 all branches from the list of new branches are moved to the list of current branches. Accordingly, after block 180 /root/a is the only branch in the list of current branches. Now, the processing of block 120 is repeated for the next component in the expression to be converted, and block 160 is repeated for each branch in the list of current branches.

An empty list of new branches is created in block 130. Then, block 140 parses the next expression component /c and identifies the branches it references relative to /root/a the current expression branch. Relative to /root/a the parsed expression component /c appears in the schema once, and therefore the true branch of decision block 150 is taken. In block 154, the current expression branch /root/a is copied to the list of new branches once (because only one variant appears in the schema), and the parsed and identified expression branch /c is appended to the newly created branch.

The repeated processing of block 160 terminates because /root/a is the only branch in the list of current branches. Once again, in block 170 the list of current branches is emptied and in block 180 all branches from the list of new branches are moved to the list of current branches. Accordingly, after block 180 the list of current branches includes /root/a/c. Having processed all components in the expression to be converted, the processing of block 120 terminates. That all components in the expression have been processed may be determined, for example, by a failure in processing block 140 to parse any additional expression components. In block 190, the list of current branches is returned to the requestor.

For the second example, the XPath expression /root/*/c is to be converted. At block 110, an empty list of current branches is created. Following block 110, the processing of block 120 is repeated for all components in the expression—three in this example. Beginning in block 130 an empty list of new branches is created. Then, the processing of block 160 is repeated for all branches in the list of current branches. The first time through processing block 120 and processing block 160, the list of current branches and the current expression branch are empty. The next expression component /root is parsed and the branches it references (the variations of the expression component in the schema) are identified in block 140. Because /root appears once in the schema, the number of variants is one. In block 154, the current expression branch, which is empty the first time through block 120 and block 160, is copied to the list of new branches once and /root is appended.

At this stage, all branches in the list of current branches have been considered so the processing of block 160 terminates. The list of current branches is emptied in block 170 and all of the branches from the list of new branches (/root) are copied to the list of current branches in block 180. Now, the processing of block 120 is repeated for the next component in the expression to be converted. An empty list of new branches is created at block 130. Then, in block 140 the next expression component /* is parsed and the branches it references relative to the current expression branch /root are identified. Relative to /root the parsed expression component /* refers to every branch at the first level of the schema, which in this case is three (/a, /d, and /f), and therefore the true branch of decision block 150 is taken. In block 154, the current expression branch /root is copied to the list of new branches three times, and the identified expression branches /a, /d, and /f are appended to the newly created branches. At this stage /root/a, /root/d, and /root/f are in the list of new branches.

Because /root is the only branch in the list of current branches, the processing of block 160 terminates. In block 170, the list of current branches is emptied and in block 180 all branches from the list of new branches are moved to the list of current branches. Accordingly, after block 180 /root/a, /root/d, and /root/f are the branches in the list of current branches. Now, the processing of block 120 is repeated for the next component in the expression to be converted, and block 160 is repeated for each branch in the list of current branches.

An empty list of new branches is created in block 130. Then block 140 parses the next expression component /c and identifies the branches it references relative to /root/a the current expression branch. Relative to /root/a the parsed expression component /c appears in the schema once, and therefore the true branch of decision block 150 is taken. In block 154, the current expression branch /root/a is copied to the list of new branches once (because only one variant appears in the schema), and the identified expression branch /c is appended to the newly created branch. At this stage, the list of new branches includes /root/a/c. For the list of current branches /root/a, /root/d, and /root/f, only /root/a has been processed by block 160.

With /root/d as the current expression branch, block 140 again parses the next expression component /c and identifies the branches it references relative to /root/d. Relative to /root/d the parsed expression component /c appears in the schema once, and therefore the true branch of decision block 150 is taken. In block 154, the current expression branch /root/d is copied to the list of new branches once, and the parsed expression branch /c is appended to the newly created branch. At this stage, the list of new branches includes /root/a/c, which was added previously, and /root/d/c, which was just added during this iteration of block 160. Now, of the list of current branches /root/a, /root/d, and /root/f, both /root/a and /root/d have been processed by block 160.

Finally, with /root/f as the current expression branch, block 140 again parses the next expression component /c and identifies the branches it references relative to /root/f. Relative to /root/f the parsed expression component /c does not appear in the schema, and therefore the false branch of decision block 150 is taken. In block 152, the current expression branch /root/f is removed as inconsistent, which may include operations such a removing /root/f from the list of current branches, not copying the /root/f to the list of new branches, etc. The list of new branches now includes /root/a/c and /root/d/c, both of which were added previously. At this stage, each branch of the list of current branches /root/a, /root/d, and /root/f has been processed by block 160.

The repeated processing of block 160 terminates because /root/f is the last branch in the list of current branches. Accordingly, in block 170 the list of current branches is emptied, and in block 180 all branches from the list of new branches are moved to the list of current branches. After block 180 the list of current branches includes /root/a/c and /root/d/c. Having processed all components in the expression to be converted, the processing of block 120 terminates. As indicated above, that all components in the expression have been processed may be determined by a failure in processing block 140 to parse any additional expression components. In block 190, the list of current branches is returned to the requestor.

For the third example, the XPath expression //* is to be converted. At block 110, an empty list of current branches is created. Following block 110, the processing of block 120 is repeated for all components in the expression—one in this example. Beginning in block 130 an empty list of new branches is created. Then, the processing of block 160 is repeated for all branches in the list of current branches. The first time through processing block 120 and processing block 160, the list of current branches and the current expression branch are empty. The next and only expression component //* is parsed and the branches it references (the variations) are identified in block 140.

Because //* references all branches in the schema, the number of variants is nine. In block 154, the current expression branch, which is empty the first time through block 120 and block 160, is copied to the list of new branches nine times and the identified expression branches /root, /root/a, /root/a/c, /root/a/x, /root/d, /root/d/b, /root/d/c, /root/f, and /root/f/b are appended to the newly created branches.

At this stage, all branches in the list of current branches have been considered so the processing of block 160 terminates. The list of current branches is emptied in block 170 and all of the branches from the list of new branches (/root, /root/a, /root/a/c, /root/a/x, /root/d, /root/d/b, /root/d/c, /root/f, and /root/f/b) are copied to the list of current branches in block 180. Having processed all components in the expression to be converted, the processing of block 120 terminates. As indicated above, that all components in the expression have been processed may be determined, for example, by a failure in processing block 140 to parse any additional expression components. In block 190, the list of current branches is returned to the requester.

Figure 2:
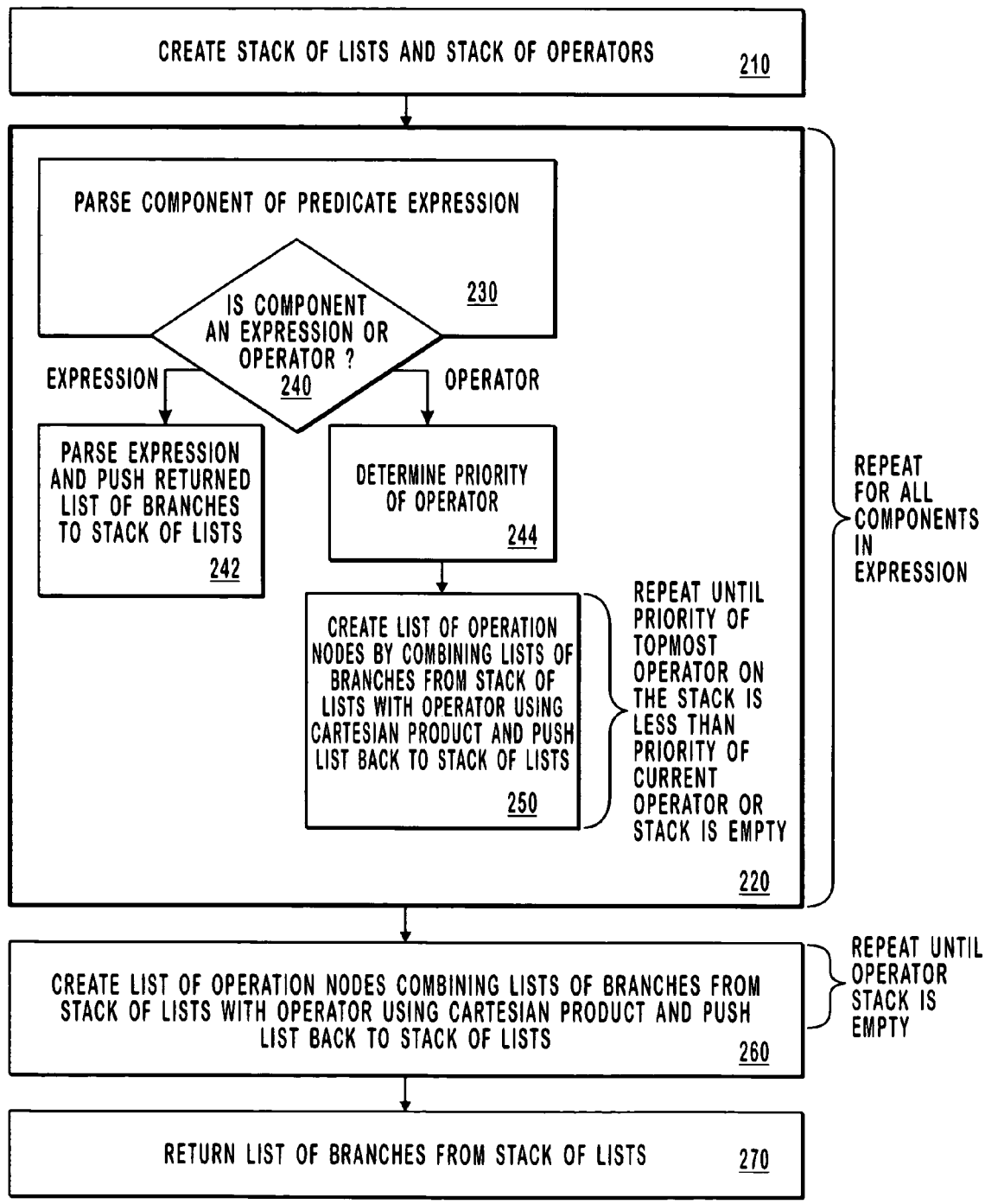
FIG. 2 is a flowchart of an example embodiment for identifying branches referenced by a predicate in accordance with the present invention.

FIG. 2 is a flowchart of an example embodiment for identifying branches referenced by a predicate of an expression. After describing the flowchart of FIG. 2, an example XPath expression predicate is converted for the example XML schema shown in Table I. At block 210, a stack of lists and a stack of operators are created. Note that the term "stack" should be interpreted broadly to encompass any collection of zero of more data items and is not necessarily limited to any particular data structure or data object. Block 220 is repeated for all components in the predicate expression. In block 230 a component of the predicate expression is parsed. Following decision block 240, if the component represents an expression, block 242 is executed. In block 242, the expression is parsed to determine all of the schema branches that it references. In one embodiment, this parsing follows the processing outlined above with respect to FIG. 1.

Following the operator branch of decision block 240, if the component represents an operator, the priority of the operator is determined in block 244. Block 250 is repeated until the priority of the topmost operator on the operator stack is less than the priority of the current operator that was just parsed or until the operator stack is empty. In block 250, a list of operation nodes is created by combining lists of branches from the stack of lists (e.g., those produced in block 242 and block 250) with an operator using a Cartesian or cross product. (An example of using a Cartesian or cross product is provided below with reference to an example predicate expression and the schema of Table I.) This list of operation nodes is pushed back onto the stack of lists.

After block 250, the processing of block 220 continues with the next expression component in the predicate expression. When block 220 has processed each component of the predicate expression, block 260 is repeated until the operator stack is empty. Note that the stack may be empty from the processing in block 220, so block 260 may not execute. In block 260, a list of operation nodes is created by combining lists of branches from the stack of lists (e.g., those produced in block 242 and block 250) with any remaining operators from the stack of operators using a Cartesian or cross product. This list of operation nodes is pushed back onto the stack of lists. Following block 260 (and possibly following block 250), only one list of branches will be in the stack of lists. Block 270 returns a list of branches from the stack of lists.

The example the XPath predicate expression [*=*] is part of an XPath expression /root/d [*=*] which is converted in a similar fashion as those described above with respect to FIG. 1. In particular, when block 140 of FIG. I encounters the predicate expression while parsing expression components, the processing of FIG. 2 may be invoked. Note that the predicate expression [*=*] is itself an expression that may include any number of components, such as *,=, and * in this case.

In block 210, a stack of lists and a stack of operators are created, such as by clearing existing storage or allocating new storage for the stacks. The processing of block 220 is repeated for each component of the predicate expression, or three times in this case. In block 230, the first component * of the predicate expression is parsed. Decision block 240 determines that this component is an expression. Although in this example the expression is relatively simple, the present invention and the embodiments shown in FIGS. 1 and 2 are able to handle arbitrarily complex expressions.

Block 242 parses the expression in the manner described with respect to FIG. 1 and pushes the returned list of branches to the stack of lists. Relative to /root/d, the list of branches includes b and c. Processing continues at block 230 by parsing the next component=of the predicate expression. Decision block 240 determines that this component is an operator. In block 244 the priority of the operator is determined. (Mathematical priority is one common example, but in general priority depends on the specific operators supported by a particular expression language.) Because no operators are on the operator stack, block 250 is not executed. If block 250 were executed, the processing would be similar to the processing of block 260 as described below.

Therefore, processing continues at block 230 by parsing the last component * of the predicate expression. As above, decision block 240 determines that this component is an expression. Here too, block 242 parses the expression and pushes the returned list of identified branches to the stack of lists. Relative to /root/d, the list of branches includes b and c. Because all components of the expression have been considered, the processing of block 220 terminates.

In block 260 a list of operation nodes is created by combining lists of branches from the stack of lists with operators using a Cartesian or cross product. The stack of lists contains two lists. Each of the lists includes two branches b and c. The Cartesian or cross product produces all possible combinations from the two lists, specifically [b=b], [b=c], [c=b], and [c=c] . The resulting list is pushed back to the stack of lists and returned to the requestor in block 270. The requestor then combines the parsed predicate expression with other expression branches as appropriate. For example, if the requestor is block 140 of FIG. 1, the fully converted example expression that referenced multiple hierarchy branches would be converted to four expressions, /root/d[b=b], /root/d[b=c], /root/d [c=b], and /root/d [c=c], each referencing a single hierarchy branch.

Figure 3:
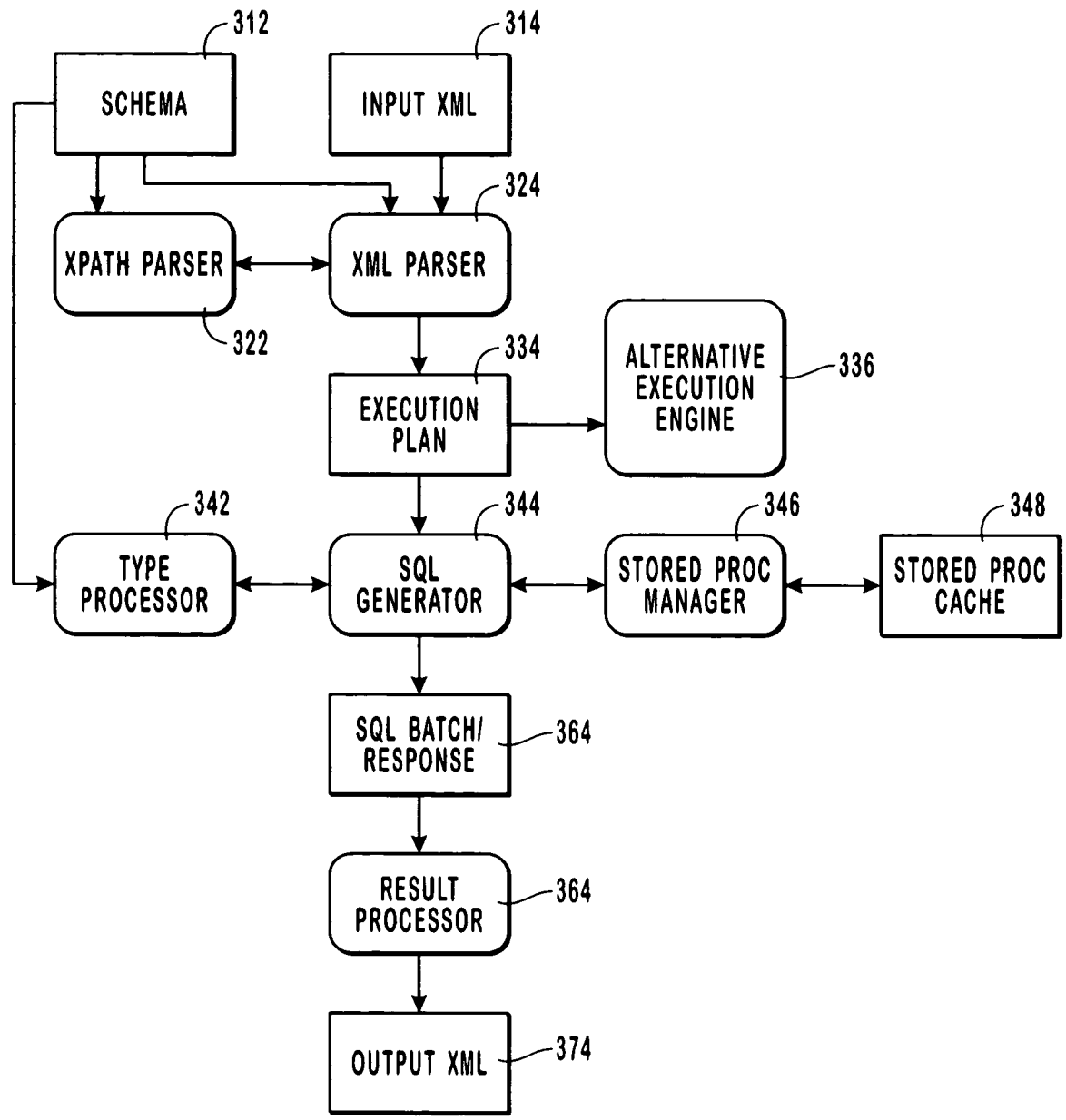
FIG. 3 shows a block diagram for an example system that references SQL data using XML.

FIG. 3 shows a block diagram for an example system that references SQL data using XML. Blocks with square corners represent data and blocks with rounded corners represent processing operations. For various reasons, it may be desirable or necessary to store and manage XML data using SQL resources. Accordingly, schema 312 is an XML schema that describes the organization of the data to be accessed. Input XML 314 includes some type of reference to the branches of the XML schema, such as an XPath statement for querying, adding, deleting, or updating the XML data. It should be noted that the input XML 314 does not need to know the underlying storage or management mechanism for the XML data.

XML parser 324 and XPath parser 322 determine the type of operation invoked by the input XML 314. The embodiments of the present invention described in reference to FIGS. 1 and 2 are examples of an XML parser 324. As indicated above, the input XML may include a single expression that references multiple branches within the XML schema. XML parser 324 converts the single XML expression into multiple XML expressions that each reference a single branch. The result of this conversion is execution plan 334.

Execution plan 334 may be used by an alternative execution engine 336 or SQL generator 344. SQL generator 344 uses type processor 342 to assure accurate data typing (XML has relatively less strict typing that does SQL). Stored procedure manager 346 and stored procedure cache 348 contain SQL statements for accessing SQL data. If no stored procedures exist for the input XML 314, SQL generator 344 generates the corresponding SQL and uses stored procedure manage 346 and stored procedure cache 348 to store the generated SQL.

SQL generator 344 produces SQL batch/response 364 in response to execution plan 334. Results processor 364 takes the SQL batch/response 364 and converts it to output XML 374. Accordingly, the requestor has no need to know about the underlying storage and management mechanism for the XML data being accessed. From the requesters perspective, input XML 314 performs some operation on XML data and output XML 374 is the response. That the XML data happens to be stored and managed using SQL is transparent. Nevertheless, in some embodiments, the allowable XML may be restricted to simplifying the foregoing process.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is, not necessarily limited to any particular ordering or combination of acts and/or steps.

A step for providing storage for one or more current branches and/or one or more new branches may include an act of creating an empty list of current branches and/or an empty list of new branches, such as by allocating new memory or appropriately organizing existing memory. A step for identifying each branch that is referenced by a current expression component of a single expression may include an act of parsing the current expression component. A step for placing each identified branch in the storage of new branches may include an act of adding a new branch to the list of new branch for each identified branch, such as by copying a base branch expression for each identified branch and then appending each identified branch to each copied base branch expression.

A step for treating the current branch as inconsistent may include an act of removing the particular base branch from consideration, such as by deleting the particular base branch from a list of current branches or by failing to copy any form of the particular base branch to a list of new branches. A step for clearing the storage for current branches and/or clearing the storage for new branches may include an act of deleting or removing all branches from the storage or allocating new storage. A step for placing each branch from the storage for new branches in the storage for current branches may include an act of adding each branch from the storage for new branches in the storage for current branches, such as by copying or indicating in some fashion that the new branches are current branches.

A step for identifying each predicate branch that is referenced by a predicate may include an act of parsing each predicate expression to identify each branch referenced by the predicate expression. A step for including each identified predicate branch in a list of predicate branches may include an act of adding each identified predicate branch to the list of predicate branches. A step for including a list of predicate branches in a group of lists may include an act of adding the list of predicate branches to a stack of lists. A step for determining the priority of one or more operators may include the act of evaluating the priority of the one or more operators according to an assigned, associated, or implied priority. A step for combining one or more lists of predicate branches with one or more operators to form a list of operator components may include an act of creating a list of operator components using a Cartesian product. A step for including the list of operator components in a group of lists may include an act of adding the list of operator components to a stack of lists.

FIG. 4 illustrates an example system that provides a suitable operating environment for practicing the present invention. The embodiments of the present invention may comprise one or more special purpose and/or one or more general purpose computers including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for converting a single expression that references multiple branches within a hierarchical schema into multiple expressions that each reference a single branch of the hierarchical schema, the computer system comprising:
   one or more processors that execute computer-executable instructions; and
   one or more computer readable media with computer-executable instructions to be executed by the one or more processors, the computer-executable instructions comprising:
      computer-executable instructions for receiving an expression referencing data which is described by a hierarchical schema, wherein the expression comprises one or more components each of which may reference one or more branches of the hierarchical schema;
      computer-executable instructions for creating an empty list of new branches;
      computer-executable instructions that for a particular base branch, parse a component of the expression to identify each branch with respect to the particular base branch that is referenced by the parsed component; and
      computer-executable instructions that for each identified branch, add a new branch to the list of new branches, wherein each new branch comprises an identified branch combined with the particular base branch.

2. A computer system as recited in claim 1, wherein the particular base branch is selected from a list of one or more current branches, the computer-executable instructions further comprising:
   computer-executable instructions for selecting each current branch in the list of current branches as the particular base branch; and
   computer-executable instructions for repeating the computer-executable instructions for parsing a component of the expression for each particular base branch that is selected.

3. A computer system as recited in claim 1, the computer-executable instructions further comprising:
   computer-executable instructions for creating an empty list of current branches;
   computer-executable instructions for copying the list of new branches to the empty list of branches, wherein the list of new branches comprises at least one new branch; and
   computer-executable instructions for selecting one current branch from the list of current branches as the particular base branch.

4. A computer system as recited in claim 1, wherein the component of the expression comprises a predicate that limits which of zero or more branches with respect to the particular base branch are referenced.

5. A computer system as recited in claim 4, wherein the predicate comprises one or more components, including at least one of either a predicate expression or a predicate operator.

6. A computer system as recited in claim 5, the computer-executable instructions further comprising:
   computer-executable instructions for parsing each predicate expression to identify each predicate branch that is referenced by the predicate expression;
   computer-executable instructions for adding each identified predicate branch to a list of predicate branches;
   computer-executable instructions for adding the list of predicate branches to a stack of lists; and
   computer-executable instructions that for each of one or more operators:
      evaluate the priority of the one or more operators;
      create a list of operator components by combining one or more lists of predicate branches from the stack of lists with the one or more operators using a Cartesian product; and
      add the list of operator components to the stack of lists.

7. A computer system as recited in claim 6, wherein the computer-executable instructions that create a list of operator components and add the list of operator components are repeated until the stack of lists is empty.

8. A computer system as recited in claim 1, wherein the hierarchical schema comprises an eXtensible Markup Language ("XML") schema, and wherein the expression comprises an XPath expression.

9. A computer system for converting an expression that references multiple branches within a hierarchical schema into multiple expressions that each reference a single branch of the hierarchical schema, the computer system comprising:
   one or more processors that execute computer-executable instructions; and
   one or more computer readable media with computer-executable instructions to be executed by the one or more processors, the computer-executable instructions comprising:
      computer-executable instructions for receiving an expression referencing data which is described by a hierarchical schema, wherein the expression comprises one or more components each of which may reference one or more branches of the hierarchical schema, computer-executable instructions for providing storage for zero or more current branches;

computer-executable instructions for providing storage for zero or more new branches;

computer-executable instructions that for each of one or more current branches, identify each branch that is referenced by a current expression component of the single expression with respect to the current branch; and computer-executable instructions for placing each identified branch in the storage for new branches; and computer-executable instructions that if no branch is identified as referenced by the current expression component of the single expression, treat the current branch as inconsistent.

10. A computer system as recited in claim 9, wherein the storage for current branches contains a plurality of current branches, and wherein the computer-executable instructions for identifying, placing, and removing are repeated for each of the plurality of current branches.

11. A computer system as recited in claim 9, the computer-executable instructions further comprising:

computer-executable instructions for clearing the storage for current branches;

computer-executable instructions for placing each branch from the storage for new branches in the storage for current branches; and computer-executable instructions for clearing the storage for new branches.

12. A computer system as recited in claim 9, wherein the expression comprises one or more expression components, and wherein the computer-executable instructions for (i) clearing the storage for new branches, (ii) identifying each branch that is referenced by the current expression component of the expression with respect to the current branch, for each of one or more current branches, (iii) placing each identified branch in the storage for new branches, (iv) removing the current branch from the storage for current branches, if no branch is identified as referenced by the current expression component of the expression, (v) clearing the storage for current branches, and (vi) placing each branch from the storage for new branches in the storage for current branches, are repeated for each of the one or more expression components of the expression.

13. A computer system as recited in claim 9, wherein the current branch is empty, indicating that the current expression component of the expression is relative to the entire hierarchical schema.

14. A computer system as recited in claim 9, wherein the current expression component of the expression comprises a predicate for determining which of zero or more branches with respect to the current branch are referenced, and wherein the predicate comprises zero or more predicate expressions and zero or more predicate operators.

15. A computer system as recited in claim 14, the computer-executable instructions further comprising:

computer-executable instructions for identifying each predicate branch that is referenced by a predicate expression;

computer-executable instructions for including each identified predicate branch in a list of predicate branches;

computer-executable instructions for including the list of predicate branches in a group of lists;

computer-executable instructions for determining the priority of one or more operators;

computer-executable instructions for combining one or more lists of predicate branches from the group of lists with the one or more operators to form a list of operator components; and computer-executable instructions for including the list of operator components in the group of lists.

16. A computer system as recited in claim 15, wherein the computer-executable instructions for combining one or more lists of predicate branches with one or more operators to form a list of operator components and the computer-executable instructions for including the list of operator components in the group of lists are repeated until a priority of a current operator within a group of operators has a lower priority than the one or more operators.

17. A computer system for converting an XPath expression that references multiple branches within a hierarchical eXtensible Markup Language ("XML") schema into multiple XPath expressions that each reference a single branch of the XML schema, the computer system comprising:

one or more processors that execute computer-executable instructions; and one or more computer readable media with computer-executable instructions to be executed by the one or more processors, the computer-executable instructions comprising:

computer-executable instructions for receiving a single XPath expression referencing data which is described by a XML schema, wherein the single XPath expression comprises one or more components each of which may reference one or more branches of the XML schema, computer-executable instructions for creating an empty list of new branches;

computer-executable instructions that for a particular base branch, parse a component of the single XPath expression to identify each branch with respect to the particular base branch that is referenced by the parsed component; and computer-executable instructions that for each identified branch, add a new branch to the list of new branches, wherein each new branch comprises an identified branch combined with the particular base branch.

18. A computer system as recited in claim 17, wherein the computer-executable instructions further comprise computer-executable instructions for removing the particular base branch from consideration as inconsistent if no branches are identified with respect to the particular base branch.

19. A computer system as recited in claim 17, wherein the single XPath expression comprises multiple components, and wherein the computer-executable instructions further comprise computer-executable instructions for parsing each of the multiple components.

20. A computer system as recited in claim 17, wherein the computer-executable instructions for creating a list of operator components and adding the list of operator components are repeated until a priority of a topmost operator of an operator stack has a lower priority than the one or more operators.

* * * * *